Figure 1:
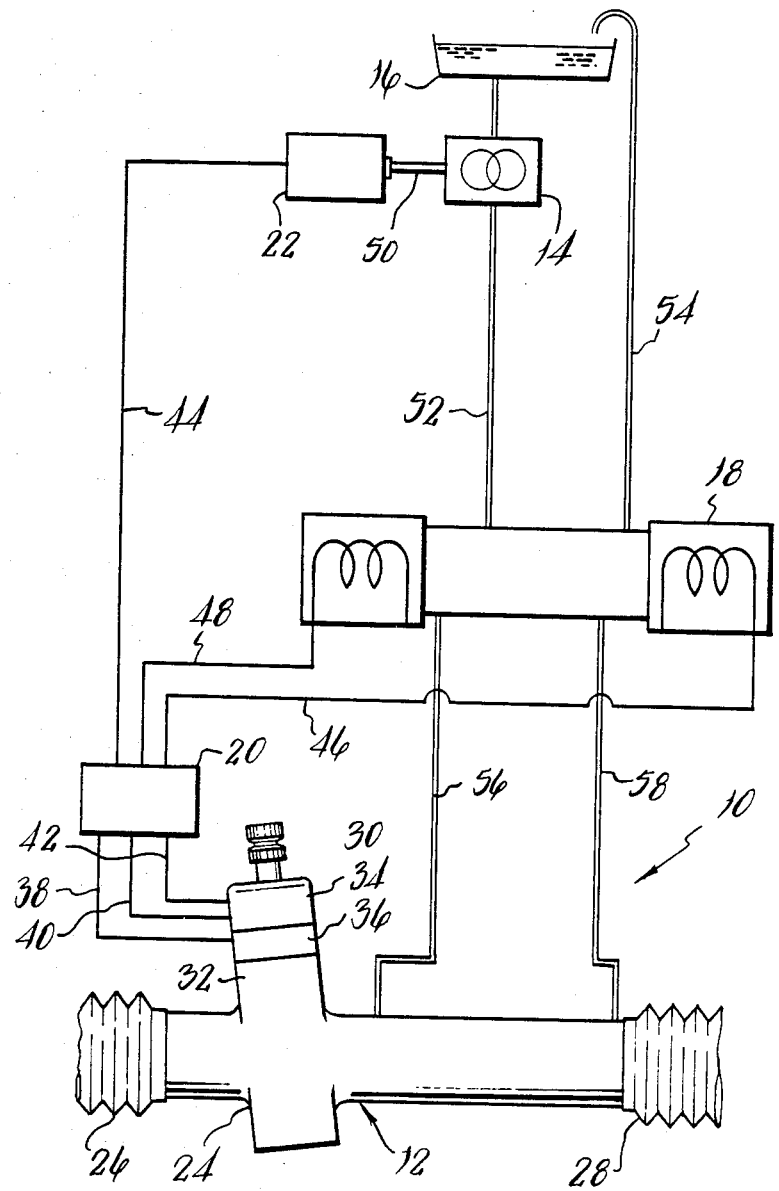

United States Patent [19]

Adams et al.

[11] Patent Number: 4,627,509

[45] Date of Patent: Dec. 9, 1986

[54] POWER ASSISTANCE STEERING SYSTEMS FOR VEHICLES

[75] Inventors: Frederick J. Adams, Clevedon; Kenneth J. D. Heap, Cheddar, both of England

[73] Assignee: TRW Cam Gears Limited, Clevedon, England

[21] Appl. No.: 727,822

[22] Filed: Apr. 26, 1985

[30] Foreign Application Priority Data

May 5, 1984 [GB] United Kingdom ............... 8411607

[51] Int. Cl.$^4$ .................................................. B62D 5/06
[52] U.S. Cl. .................................................. 180/142
[58] Field of Search ................. 180/141, 142, 143; 364/424

[56] References Cited

U.S. PATENT DOCUMENTS

| | | | |
|---|---|---|---|
| 3,991,846 | 11/1976 | Chichester et al. | 180/132 |
| 4,476,529 | 10/1984 | Nakamura | 364/424 |
| 4,540,059 | 9/1985 | Shibahata et al. | 180/141 |
| 4,557,342 | 12/1985 | Drutchas | 180/132 |

FOREIGN PATENT DOCUMENTS

| | | | |
|---|---|---|---|
| 55-94855 | 7/1980 | Japan | 180/141 |
| 57-110565 | 7/1982 | Japan | 180/142 |
| 58-180380 | 10/1983 | Japan | 180/142 |

*Primary Examiner*—John A. Pekar
*Attorney, Agent, or Firm*—Yount & Tarolli

[57] ABSTRACT

A power assistance steering system 10 for a vehicle comprises steering gear 12 having an internal hydraulic ram supplied with hydraulic fluid by a pump 14 from a reservoir 16 via a solenoid valve 18 controlled by a micro-processor 20 which also controls an electric motor 22 for driving pump 14. Steering input torque is sensed by a torque sensor 36 and steering direction is sensed by a direction switch 34. Output signals from these devices are fed to micro-processor 20 which controls solenoid valve 18 and pump motor 22 accordingly, varying the motor speed in accordance with the pressure requirements of the steering ram as sensed by the torque sensor. In a further embodiment the pump is driven at a constant speed and a proportional control valve 74 is controlled by a micro-processor 78 to vary the fluid pressure supply.

4 Claims, 2 Drawing Figures

POWER ASSISTANCE STEERING SYSTEMS FOR VEHICLES

This invention relates to power assistance steering systems for vehicles.

In our prior United Kingdom patent application GB No. 2 119 326 A we have disclosed a power assistance steering system for vehicles providing relatively sophisticated steering control based on the monitoring of a range of vehicle parameters and including, moreover, additional functions relating to safety aspects of such steering systems.

An object of the present invention is to provide an improved power assistance steering system for vehicles and/or such a system offering advantages in relation to one or more of the following factors, namely manufacturing cost, simplicity of operation, reliability of operation, and related factors.

According to the invention there is provided a power assistance steering system for a vehicle as defined in the accompanying claims.

In an embodiment described below there is disclosed a power assistance steering system for a vehicle in which a fluid pump delivers hydraulic fluid to a servo motor in the form of a hydraulic ram connected to the vehicle steering gear to provide power assistance. An input sensor in the form of a strain gauge or torque sensor is associated with the input means of the steering system so as to sense the torque or thrust generated in the steering system by the driver of the vehicle by use of the steering wheel. A fluid pressure control system is provided to control the fluid pressure supplied to the servo motor in accordance with signals generated by the input sensor. In this embodiment, the fluid pressure control system comprises a direction switch responsive to the driver's intended vehicle direction, and the torque sensor is connected to a micro-processor which controls both a solenoid operated valve and an electric motor driving the pump. The solenoid operated valve directs the fluid pressure to the relevant chamber of the double acting ram of the servo motor. The microprocessor controls the electric motor driving the pump so that the latter is driven at varying speeds so as to provide a variable output pressure in accordance with the requirements of the servo-motor as sensed by the input sensor. In this embodiment the solenoid operated valve is constructed to move to a fully open position on actuation, and the pressure control determining the degree of power assistance is provided by variation of the pump speed.

In another embodiment, the solenoid operated valve is likewise constructed to move to a fully open position on actuated, but pressure control is provided by a control valve on the upstream side of the solenoid operated valve.

Both of these embodiments have the advantage that the construction of the solenoid operated valve is greatly simplified, and hence its cost is reduced, since it is not required to provide pressure control. Moreoever, the separation of the functions of direction control and pressure control leads to greater reliability in service.

Further features of the embodiments described below include the fact that the pump is arranged to be driven only during operation of the power assistance system, and is not driven during non power-assisted vehicle steering movements. In an embodiment, this is achieved by means of an electric motor drive for the pump and appropriate control signals thereto from the microprocessor.

Also disclosed below in one of the embodiments, is the provision in the fluid pressure control system for the power assistance system not to be actuated until the driver's steering input rises above the level required for driving generally straight ahead or with minor changes of course, so that such manoeuvres are not power-assisted.

Figure 2:
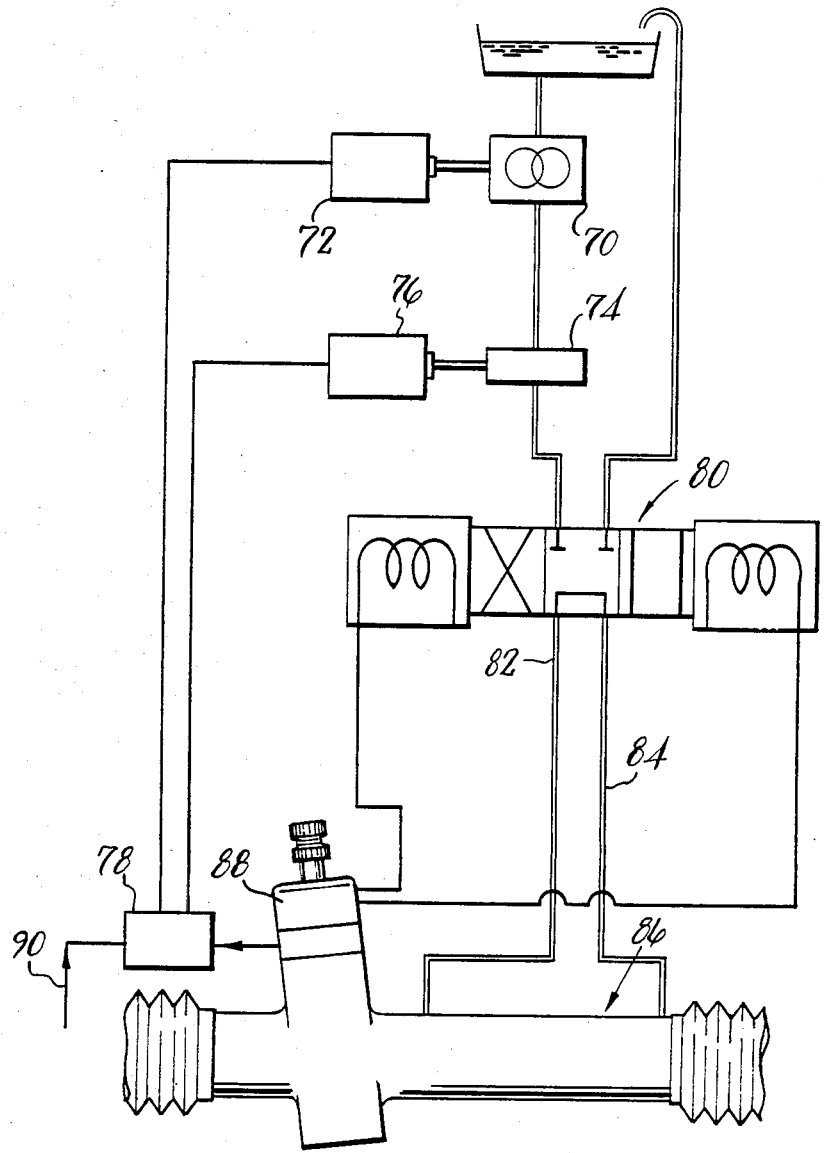

Embodiments of the invention will now be described by way of example with reference to the accompanying drawings in which:

FIG. 1 shows, diagrammatically, a power-assistance steering system for vehicles; and FIG. 2 shows a steering system similar to that of FIG. 1 but incorporating certain modifications.

As shown in FIG. 1, a power assistance steering system 10 for a vehicle (not shown) comprises steering gear 12 having an internal hydraulic ram (not shown) supplied with hydraulic fluid by a pump 14 from a reservoir 16 via a solenoid valve 18 controlled by a microprocessor 20 which also controls an electric motor 22 for driving pump 14.

Steering gear 12 comprises a main body 24 housing the hydraulic ram which constitutes a servo motor for the power assistance steering system. At opposite ends of main body 24 gaiters 26, 28 project endwise and engage and protect steering links (not shown) connected to the steerable wheels of the vehicle, the links being arranged to be power-operated by the ram and to be manually operated by a conventional rack and pinion steering system housed within main body 24 and connected via a steering shaft 30 to a driver's steering wheel of the vehicle.

Steering shaft 30 is rotatably mounted in a pinion housing 32 forming part of main body 24 and in which a pinion which is rotatable with steering shaft 30 is housed and engages the rack (not shown) connected to the steering links.

Also located within pinion housing 32 are a direction switch 34 and a torque sensor 36 which are connected by conductors 38, 40 and 42 to micro-processor 20 and hence by conductors 44, 46 and 48 to pump motor 22 and solenoid valve 18.

Pump 14 is driven by motor 22 via a drive shaft 50. Hydraulic conduits 52, 54 connect reservoir 16 to solenoid valve 18 and provide , respectively, a hydraulic pressure flow and a return flow. Conduits 56, 58 connect solenoid valve 18 to the ram housed within main body 24, and each provides for a two-way hydraulic flow, according to the direction of actuation of the ram.

In broad outline, the system operates as follows. Steering input torque is sensed by torque sensor 36 and steering direction is sensed by direction switch 34. Output signals from these devices are fed to micro-processor 20 which controls solenoid valve 18 and pump motor 22 accordingly so that steering gear 12 is appropriately actuated.

Torque sensor 36 may comprise a strain gauge mounted on steering shaft 30 or elsewhere in the steering gear between the driver's steering wheel and the hydraulic ram or servo motor. Other steering input sensing devices may equally be used so as to provide an electrical output signal related to the driver's input torque.

Direction switch 34 provides an output signal to the micro-processor indicating the required direction of power assistance so that, by appropriate actuation of solenoid valve 18, the relevant chamber in the double acting ram in main body 24 is pressurised—the other chamber being connected through valve 18 to reservoir 16.

Solenoid valve 18 also provides for conduits 56, 58 to be freely interconnected when power assistance is not required so that manual steering can be effected by means of the rack and pinion steering system.

Micro-processor 20 is arranged to control the electric motor 22 for pump 14 so as to vary the motor speed in accordance with the pressure requirements of the steering ram or servo motor—as sensed by torque sensor 36. In other words, when the steering input torque from the driver is large, the pump motor is driven fast to provide a high pressure hydraulic output for the ram, and conversely when the torque input is lower, a lower hydraulic pressure is provided by driving the pump motor more slowly.

In this embodiment, the solenoid valve 18 is constructed so as to be either fully open or fully closed, with no significant intermediate position. With this arrangement, the variable pump speed enables the operation of the steering ram nevertheless to be controlled in a quantitative way.

Micro-processor 20 provides valve-opening and direction control signals through conductors 46, 48 to solenoid valve 18 for the purpose described above.

In the embodiment of FIG. 2, the general arrangement is similar to that of FIG. 1, but with the following changes.

Pump 70 is driven by electric motor 72 at a generally constant speed, or may be mechanically driven by the engine of the vehicle, so as to provide a fairly constant fluid output pressure.

Downstream of pump 70 is provided a proportional control valve 74 which is operated by an actuator 76, such as a solenoid actuator, controlled by a micro-processor 78.

Solenoid operated valve 80 again provides steering direction control by directing the fluid pressure output to either of fluid output lines 82, 84 which are connected to the relevant chambers of the double acting ram of the steering gear 86. Direction control signals derive from direction switch 88 as in the previous embodiment, but pass direct to the solenoid valve 80.

An electrical input 90 is provided on micro-processor 78 for signals from, for example, a vehicle speed sensor. The micro-processor also provides amplification functions.

Proportional control valve 74 may be of the axial or rotary kind, having an open or closed centre, with a single input and a single output connection. As in the case of solenoid valve 80, control valve 74 may be a spool valve, but it is in any case arranged to be operated by actuator 76 so as to provide a controlled fluid pressure output to the on/off direction control valve 80.

A further feature of the fluid pressure control system of FIG. 1 which is applicable also to that of FIG. 2 is provided by the characteristic of the micro-processor 20 whereby pump 14 is driven only during operation of the power assistance system and is not driven during non power-assisted steering movements. This feature is provided by means of the electric motor 22 which drives the pump under control of micro-processor 20—as opposed to the more usual drive arrangement in which a belt drive from the engine of the vehicle is provided whereby the pump is driven at all times and provision has to be made for dumping to tank the fluid pressure generated in excess of the steering ram's requirements.

A related feature of the fluid pressure control system also resides in the function of micro-processor 20 whereby the power assistance system is not actuated until the driver's steering input to the steering gear via steering shaft 30 rises above the level required for driving generally straight ahead and with minor changes of course. In this way, such manoeuvres are not power-assisted. This feature may be provided by arranging matters so that a sensed steering torque or input from the driver is insufficient to actuate the power assistance system until the steering input reaches a predetermined level.

Obviously, all power-assistance systems have some degree of initial movement of the steering wheel before the power assistance system cuts-in. In the present case, the cut-in point is adjustable but is set so that normal light duty driving manoeuvres are effected without power assistance, and it is only in the more heavy duty situation of parking the vehicle or where, for some other reason, a significant steering input torque is required that the power assistance cuts in. The cut-in point can be adjusted according to the characteristics of the vehicle concerned.

Many modifications can be made in the above embodiments without departing from the scope of the invention including sensing the driver's input in a variety of other ways, modifying the steering gear itself by the provision of an external ram or making any other physical changes which may be required. The solenoid valve can be modified by providing it in the form of two single valves. Moreover, pump 14 can be driven in various ways according to the requirements of the particular system, including the provision of non-electrical motor drives. Micro-processor 20 could be provided with facilities for the monitoring of other vehicle parameters, but in the relatively simple steering systems envisaged above, this may not be required.

We claim:

1. A power assistance steering system for a vehicle comprising:

a fluid pressure device for providing steering power assistance and having opposite chambers;

a fluid pump for providing fluid pressure directed to said fluid pressure device;

a variable speed electric motor for driving said fluid pump at different speeds to provide for variations in fluid pressure directed from said fluid pump;

solenoid operated valve means for selectively controlling fluid flow from said fluid pump to said opposite chambers of said fluid pressure device in accordance with a desired steering direction, said valve means being movable between a fully open position in which fluid flows from said fluid pump to a respective opposite chamber and a closed position in which fluid flow from said fluid pump to said fluid pressure device is blocked; and sensor means for sensing a steering torque and for generating a signal in response to the steering torque for controlling the speed of said variable speed electric motor in accordance with the steering torque to thereby control variations in fluid pressure directed from said fluid pump to said solenoid operated valve means.

2. A power assistance steering system as set forth in claim 1 wherein said sensor means also senses a steering direction and generates a control signal for actuating said solenoid operated valve means in a respective direction.

3. A power assistance steering system as set forth in claim 1 wherein said sensor means is located on a steering shaft.

4. A power assistance steering system for a vehicle comprising:
- a fluid pressure device for providing power assistance to steering and having opposite chambers;
- a fluid pump for providing fluid pressure directed to said fluid pressure device;
- motor means for driving said pump at a constant speed;
- solenoid operated valve means for selectively controlling fluid flow from said fluid pump to said opposite chambers of said fluid pressure device in accordance with a desired steering direction, said valve means being movable between a fully open position in which fluid flows from said fluid pump to a respective opposite chamber and a closed position in which fluid flow from said fluid pump to said fluid pressure device is blocked;
- a proportional pressure control valve means located upstream of said solenoid operated valve means and downstream of said fluid pump for controlling variation in fluid pressure directed to said solenoid operated valve means; and
- sensor means for sensing a steering torque and for generating a signal in response to the steering torque for controlling operation of said proportional pressure control valve means.

* * * * *